(12) United States Patent
Cannistraro et al.

(10) Patent No.: US 7,797,892 B2
(45) Date of Patent: Sep. 21, 2010

(54) KIT FOR PLUGGING A HOLE WITH A FIRE RESISTANT MATERIAL

(75) Inventors: Vincent F. Cannistraro, Lincoln, MA (US); Douglas C. Dayton, Harvard, MA (US); David Duncanson, West Newbury, MA (US); Thomas J. Kosik, Pelham, NH (US)

(73) Assignee: Buildings and Matters, LLC, Lincoln, MA (US)

( * ) Notice: Subject to any disclaimer, the term of this patent is extended or adjusted under 35 U.S.C. 154(b) by 163 days.

(21) Appl. No.: 12/028,858

(22) Filed: Feb. 11, 2008

(65) Prior Publication Data

US 2008/0216432 A1 Sep. 11, 2008

Related U.S. Application Data

(60) Provisional application No. 60/900,609, filed on Feb. 9, 2007.

(51) Int. Cl.
*E04C 2/52* (2006.01)
*E04C 2/00* (2006.01)
*F16L 55/10* (2006.01)
*F16J 15/08* (2006.01)

(52) U.S. Cl. .................. 52/220.1; 52/232; 138/89; 277/650

(58) Field of Classification Search .......... 138/89; 277/609, 626, 627, 630, 637, 650; 4/295; 428/40.1, 63, 137, 920, 921; 52/480, 514.5
See application file for complete search history.

(56) References Cited

U.S. PATENT DOCUMENTS

| | | | |
|---|---|---|---|
| 4,061,344 A * | 12/1977 | Bradley et al. ............ 277/606 |
| 4,261,598 A | 4/1981 | Cornwall | |
| 4,280,976 A | 7/1981 | von Holdt | |
| 4,363,199 A | 12/1982 | Kucheria et al. | |
| 4,364,210 A * | 12/1982 | Fleming et al. ............ 52/220.8 |
| 4,432,465 A * | 2/1984 | Wuertz .................... 220/235 |
| 4,623,170 A | 11/1986 | Cornwall | |
| 4,630,415 A | 12/1986 | Attwell | |
| 4,669,244 A | 6/1987 | Szoke | |
| 4,732,397 A | 3/1988 | Gavin | |
| 4,748,787 A | 6/1988 | Harbeke | |
| 4,799,689 A | 1/1989 | Nolf | |
| 4,805,920 A | 2/1989 | Gavin | |
| 4,932,179 A * | 6/1990 | Sosinski .................. 52/232 |
| 4,951,914 A | 8/1990 | Meyers et al. | |
| 5,040,351 A | 8/1991 | Cornwall | |

(Continued)

FOREIGN PATENT DOCUMENTS

JP 07-259211 10/1995

*Primary Examiner*—David Dunn
*Assistant Examiner*—Benjamin Pevarski
(74) *Attorney, Agent, or Firm*—Strategic Patents, P.C.

(57) ABSTRACT

Methods and systems for plugging a hole are described. A plug may comprise a substantially tubular member having a proximal end and a distal end interconnected by a side wall, the side wall having an inward facing surface and an outward facing surface, at least the outward facing surface being substantially conformable, an adhesive disposed on the outward facing surface, a fire-resistant ring disposed substantially at one of the ends of the tubular member, and a thread disposed along the inward facing surface, the thread adapted to receive a cover.

20 Claims, 6 Drawing Sheets

U.S. PATENT DOCUMENTS

| | | | |
|---|---|---|---|
| 5,286,040 A | 2/1994 | Gavin | |
| 5,297,691 A * | 3/1994 | Bottcher | 220/237 |
| 5,497,807 A | 3/1996 | Rogers | |
| 5,673,956 A | 10/1997 | Emery | |
| 5,826,886 A | 10/1998 | Hauff et al. | |
| 5,957,154 A | 9/1999 | Olaker | |
| 5,979,117 A | 11/1999 | Fuller | |
| 6,076,559 A | 6/2000 | Castillo et al. | |
| 6,076,797 A * | 6/2000 | Schnautz | 249/79 |
| 6,088,972 A | 7/2000 | Johanneck | |
| 6,101,774 A | 8/2000 | Heil | |
| 6,112,488 A | 9/2000 | Olson et al. | |
| 6,290,279 B1 | 9/2001 | Haight et al. | |
| 6,343,412 B1 | 2/2002 | Stephenson | |
| 6,349,975 B1 | 2/2002 | Heil | |
| 6,361,099 B1 | 3/2002 | McIntosh et al. | |
| 6,460,860 B2 | 10/2002 | Gavin | |
| 6,470,635 B2 * | 10/2002 | Cornwall | 52/220.8 |
| 6,494,463 B1 | 12/2002 | Rank | |
| 6,595,243 B2 | 7/2003 | Tarr | |
| 6,609,718 B1 | 8/2003 | Galvin | |
| 6,662,490 B1 * | 12/2003 | Aesch, Jr. | 43/124 |
| 6,682,257 B1 | 1/2004 | Zappe | |
| 6,691,975 B1 | 2/2004 | Galvin | |
| 6,694,684 B2 | 2/2004 | Radke et al. | |
| 6,752,174 B2 * | 6/2004 | Kristofferson et al. | 138/89 |
| 6,792,726 B1 | 9/2004 | Price | |
| 6,799,606 B1 | 10/2004 | Howson | |
| 6,863,276 B2 | 3/2005 | Kaegi | |
| 6,905,650 B2 | 6/2005 | McIntosh et al. | |
| 7,028,972 B2 | 4/2006 | Miller et al. | |
| 7,080,486 B2 | 7/2006 | Radke et al. | |
| 7,086,652 B1 | 8/2006 | Gavin | |
| 7,153,057 B1 | 12/2006 | Lucas | |
| 2003/0009961 A1 | 1/2003 | Radke et al. | |
| 2003/0192269 A1 | 10/2003 | Radke et al. | |
| 2004/0016190 A1 | 1/2004 | Radke et al. | |
| 2005/0116060 A1 | 6/2005 | Borunda | |
| 2007/0056088 A1 | 3/2007 | DeGooyer | |

* cited by examiner

KIT FOR PLUGGING A HOLE WITH A FIRE RESISTANT MATERIAL

CROSS-REFERENCE TO RELATED APPLICATIONS

This application claims the benefit of the following provisional application, which is hereby incorporated by reference in its entirety: U.S. Provisional Application No. 60/900,609 filed Feb. 9, 2007.

BACKGROUND

1. Field

This invention generally relates to plugging penetrations in concrete building floors, the penetrations being intended typically for passage of pipes, utilities, and the like.

2. Description of the Related Art

Penetrations, or openings, are commonly drilled in concrete slabs of buildings under construction in order to pass pipes, utilities, and other things through the concrete slab (e.g., a floor under construction) from one level of the buildings to another. The process of core drilling a concrete slab and setting plumbing, fire control plumbing pipes and electrical conduits and fire-proofing the installation on construction job sites is a multi-step process that is labor-intensive. The coring process in a large scale construction project creates many (sometimes hundreds or thousands of) slab bore holes that must be temporarily covered until the pipe installation is complete and the final plugging and fireproof caulking is finished.

Concrete construction utility passage holes are usually bored oversize (by a factor of 2 to 4) beyond what is necessary for passage of a particular pipe or utility. After completion of the slab boring operation with a diamond coring tool, building codes call for a temporary closure of the hole for safety reasons. For example, tools and debris can drop from one floor down onto people and things on lower floors through the hole openings causing injury and economic loss. Additionally, the holes are plugged to prevent people walking on a floor with openings in the floor from falling through or having their feet accidentally caught in the openings.

A common practice to plug construction holes in concrete floors is to use a specially-fabricated wooden hole cover or plug consisting of a shaped (e.g., rectilinear) piece of plywood backed by "2-by-4" structural wood cross bracing that is configured to fit the hole cover so as not to be dislodged by normal construction activities such as walking over the hole cover. The fabrication of thousands of wood cover plates to cover and protect all the core drilled openings in a building under construction is a time consuming and costly operation.

While specially-fabricated conventional wooden hole covers offer some protection from inadvertent accidents by intrusion of people and objects into the exposed holes they do not provide protection from water penetration and leakage, and provide little fire protection. Water from rain or other operations can run down through the holes from one floor to those below it and cause damage or pooling in the lower floors. In a large construction job site, water leakage through floor openings can be a significant problem and a cause large financial losses, e.g., if a storm inundates the site and the water finds its way down many floors through the unprotected holes into areas where finishes have already been applied. Even flooding of an unfinished basement is costly where pumping is required to make the space habitable for continued construction work and to protect the building's foundation.

Pipe fitters tend to work their way through a construction project gradually installing the piping and finalizing the penetrations in the floors. The temporary hole covers are removed and discarded and after the pipes are inserted through the holes, the perimeter around the pipe is stuffed with mineral wool to block the hole and provide a backing for fire-retardant caulking, usually required by building codes, which is hand applied to the top inch or so around the pipe, sealing it to the concrete of the side-wall of the holes. These steps are labor-intensive and thus very expensive.

In light of the above discussion, there is a need for an apparatus and a system that solves most or all of the problems of the current procedure for hole drilling and pipe installation and sealing of the penetrations.

SUMMARY

The present invention provides a method and system for securing a cored penetration in a concrete slab. The method and system may include providing a concrete hole plug. The concrete hole may include a lower hole plug and a top cover securely attached to the lower hole plug for sealing the hole. The lower hole plug may include an adhesive on the outside surface for adhering to the concrete wall of the hole and a well for holding fire-resistant sealant to form a perimeter seal on installed pipe. The top cover may include one or more securing mechanism for attaching the top cover to the hole plug. Further, the method and system may include exposing the adhesive on the outside surface of the lower hole plug, disposing the concrete hole plug into a hole bored in a concrete slab and securing the top cover to the lower hole plug using the securing mechanism.

In embodiments, the method and system may include tightening of the concrete hole plug is facilitated by a partial turn large thread member to secure the upper and lower portions of the plug. In embodiments, the method and system may include a secondary attachment of the top cover to the lower hole plug to prevent loss of the top cover when the plug is opened. In embodiments, the method and system may include circumferential fins disposed on the lower hole plug that deform when the plug is pushed into the hole and lock the lower hole plug to the concrete.

In embodiments, the securing mechanism may comprise the top cover molded with an integral nut protrusion on the top surface that engages a wrench. In embodiments, the securing mechanism may comprise a threaded attachment. In embodiments, the securing mechanism of the top cover may be substantially below the concrete surface.

In embodiments, tightening the nut may expand the hole plug against the wall of the hole to create a watertight seal and press the adhesive securely against the wall of the concrete hole to achieve a good bond.

In embodiments, the removal of the concrete hole plug may leave behind an orifice that accommodates the intended pipe installation or may leave behind a molded ring of fire-resistant sealant that is conformable with pressure. In embodiments, the lower hole plug may comprise a deformable elastomeric material. In embodiments, the lower hole plug may be pressurized by the tapered thread and may be expanded against the side-wall of the floor penetration creating a water tight seal.

In embodiments, the inside of the hole plug may comprise threads for adapting to a pipe diameter. In embodiments, stress rings in the lower wall of the hole plug may facilitate creating the appropriate hole diameter to accommodate a pipe. In embodiments, the pull tabs may facilitate creating the appropriate hole diameter to accommodate a pipe. In embodiments, the lower wall of the hole plug may be removed to accommodate a pipe.

In embodiments, the top cover may be rigid, compliant or elastomeric and may be substantially flush with the upper concrete surface. In embodiments, the top cover may comprise flexible gasket ridges that deform to provide a watertight and fire retardant seal against the wall of the hole. In embodiments, the top cover may comprise a lock to prevent unauthorized opening or removal of the concrete hole plug.

In embodiments, the perimeter seal may be tamped into a fire retardant seal around the installed pipe.

In embodiments, the adhesive may be microencapsulated, activate-able, or peel-away.

BRIEF DESCRIPTION OF THE FIGURES

The invention and the following detailed description of certain embodiments thereof may be understood by reference to the following figures.

DETAILED DESCRIPTION

While the specification concludes with the claims defining the features of the invention that are regarded as novel, it is believed that the invention will be better understood from a consideration of the following description in conjunction with the drawings figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

FIG. 1 depicts a hole drilling and pipe installation process through a concrete floor slab 102. The sequence of steps, as shown in FIG. 1, are presently used in the construction industry to core drill through the concrete floor slab 102 in a construction project, and fitting and fire-proofing the plumbing pipes and electrical conduit installed on the project.

Figure 1A:
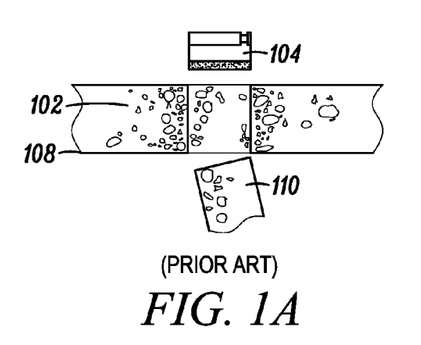
FIG. 1 depicts a hole drilling and pipe installation process through a concrete floor slab.

Pipe fitting on a construction project may begin with drilling out a core 110 from the concrete floor slab 102, as shown in FIG. 1A. During this step, a mechanical construction crew may drill out the core 110 required by the plumbing design. This is accomplished with a special machine utilizing a diamond coring bit 104 that accurately and repeatedly cores holes that are normally in one inch increments, i.e., 2", 3", 4", 5" etc. The machine will cut through not only the concrete but steel reinforcing and corrugated steel floor pans 108 that normally support the poured concrete slab and the core 110 falls to the floor below.

Figure 1B:
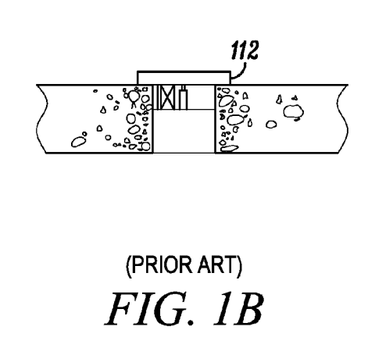

Referring to FIG. 1B, after the holes are drilled, the hole may be covered to protect people from stepping into the holes and from tools or other objects from falling through the hole and injuring someone beneath. Typically, the job site carpenters fabricate individual plywood and lumber hole covers 112 by hand, sometimes for as many as tens of thousands of holes on a larger job site. These covers stay in place, sometimes for as long as ten months, until the pipe fitters are ready to install the pipes through the hole.

Figure 1C:
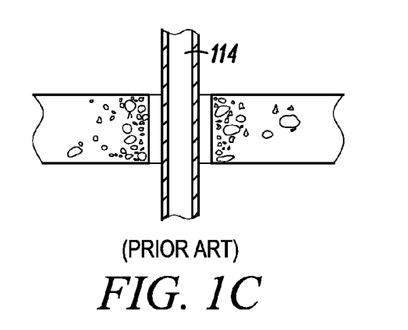

When the pipe fitters are ready to install a pipe 114 through the hole, the hole cover 112 is removed and discarded. Following this, the pipe 114 is positioned and connected to the adjoining fittings required for the plumbing design, as shown in FIG. 1C. Typically, the hole is several pipe diameters wide to provide good clearance around the pipe.

Figure 1D:
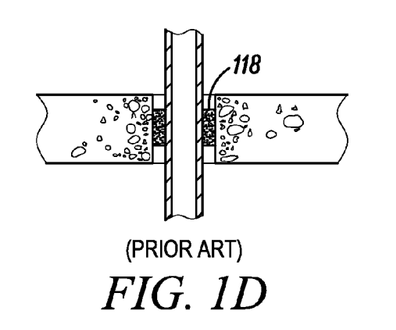

Referring to FIG. 1D, the building code often requires fire retardant caulking to be placed in the perimeter hole around the pipe 114 in the clearance area so that in the event of a fire, the fire doesn't spread between floors through the open floor penetrations. To support the caulking that is normally an inch or so thick, the pipe fitters pack mineral wool 118 around the perimeter of the pipe 114.

Figure 1E:
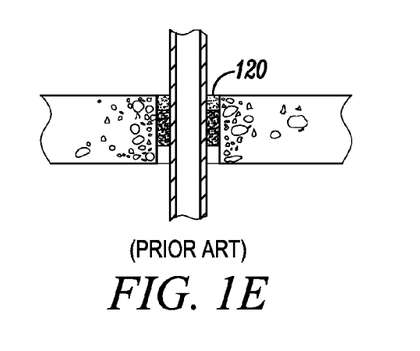

The mineral wool 118 may create a toroidal (donut shaped) mass around the pipe 114, as shown in FIG. 1E. This may seal it against the concrete wall of the hole to permit application of the fire retardant caulking 120 that is hand-applied with a caulking gun. The caulking may be one to two inches thick.

Figure 2A:
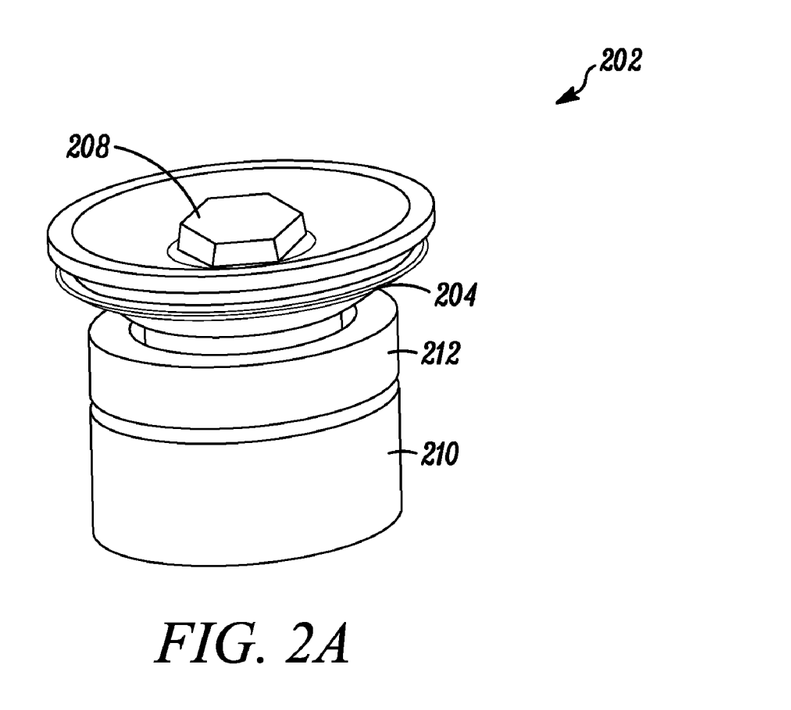
FIGS. 2A and 2B depict an exemplary deformable concrete hole plug according to an embodiment of the present invention.
Figure 2B:
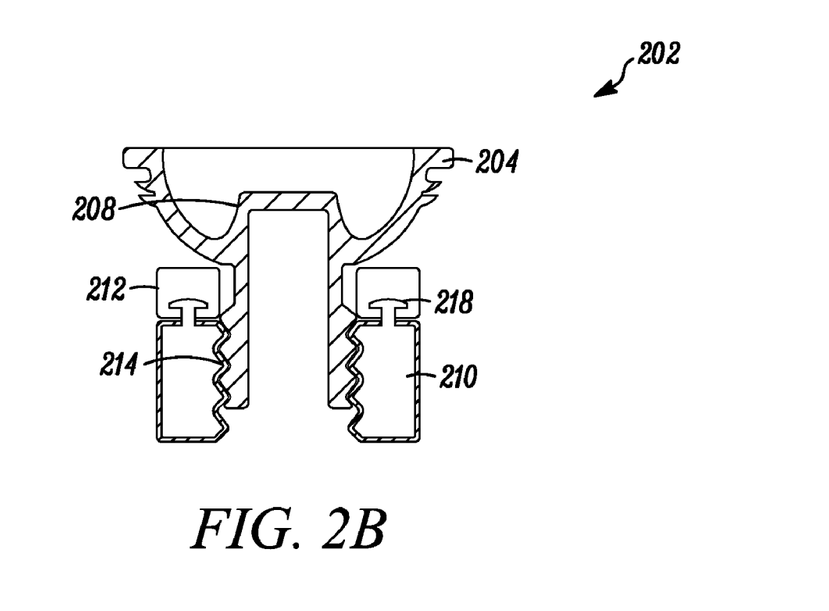

FIGS. 2A and 2B depict an exemplary deformable concrete hole plug 202 according to an embodiment of the present invention. The deformable concrete hole plug 202 may include a compliant/elastomeric top cover 204 with flexible gasket ridges that may deform to provide a water seal against the wall of the hole. Further, the elastomeric top cover 204 may be molded with an integral standard size hex nut protrusion 208, or any other fastening device, on the top surface that may engage a standard wrench. The elastomeric top cover 204 may be attached to the lower conformable hole plug 210 by a coarse thread 214, as shown in FIG. 2B. The elastomeric top cover 204 and the lower conformable hole plug 210 may be screwed together by the hex nut 208. The lower conformable hole plug 210 may have a microencapsulated adhesive or a peel away protected adhesive on the outside surface that may contact the concrete side-wall of the penetration. Sandwiched between the lower conformable hole plug 210 and the elastomeric top cover 204 and affixed 218 to the concrete hole plug 202 may be a molded ring of fire retardant sealant 212 that is conformable with pressure.

FIG. 3 depicts exemplary steps of securing the deformable concrete hole plug 202 according to an embodiment of the present invention. The deformable concrete hole plug 202 may provide safety protection for a cored hole in a concrete slab. Further, the deformable concrete hole plug 202 may seal the penetration in a watertight manner with the help of the elastomeric top cover 204.

Figure 3A:
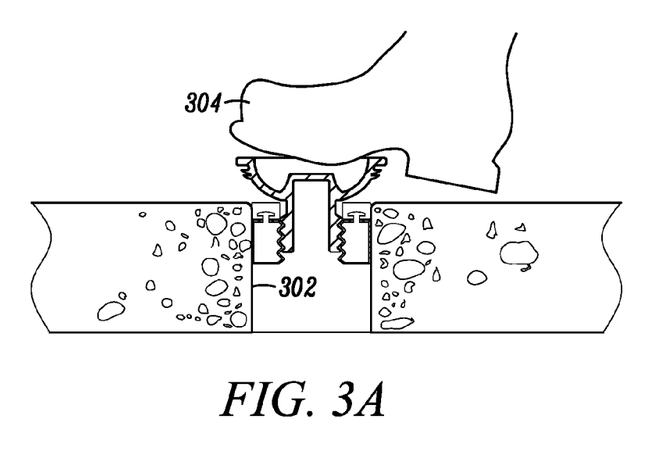
FIG. 3 depicts exemplary steps of securing a deformable concrete hole plug according to an embodiment of the present invention.

Before inserting the deformable concrete hole plug 202 in the hole, the peel away protected adhesive 308 on the outer surface 302 of the lower conformable hole plug 210 may be activated by peeling the peel away protection layer. This may activate a time delay adhesive 308 or simply expose an adhesive. Following this, the concrete hole plug 202 may be positioned into the hole and pressure 304 may be applied to push the lower conformable hole plug 210 into the hole and then engage the elastomeric top cover 204, deforming the thin flexible gasket ridges against the wall of the hole to create a water tight and fire-retardant seal. In embodiments, the pressure 304 may be applied by pressing the concrete hole plug 202 with a foot, as shown in FIG. 3A. However, in other embodiments, the concrete hole plug 202 may be inserted in the hole by applying pressure 304 using a hammer, a weight or other such means.

Figure 3B:
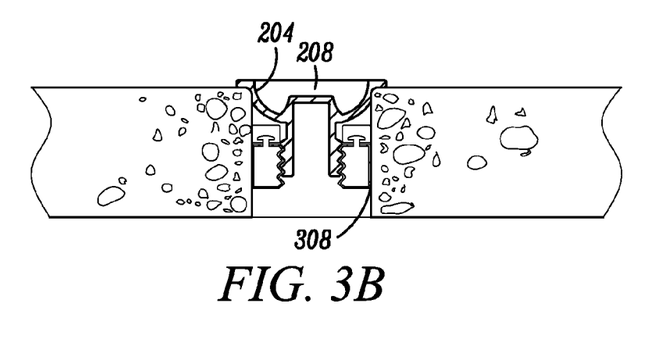

Pressure 304 is applied on the concrete hole plug 202 until the point the flange of the elastomeric top cover 204 is substantially flush with the upper concrete floor surface, as shown in FIG. 3B. Now, the flange being substantially flush with the upper concrete floor surface and the hex nut 208 or other fastener being below the upper surface, the adhesive 308 may act over time to bond the concrete hole plug 202 to the concrete wall of the hole.

Figure 3C:
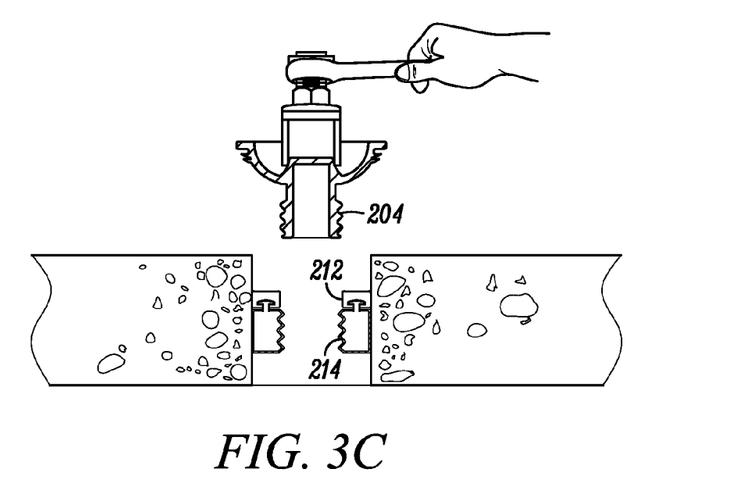

After the concrete hole plug 202 is bonded with the wall of the hole, the concrete hole plug 202 may be dismantled to remove the elastomeric top cover 204 from the lower conformable hole plug 210 using a wrench or other tool, as shown in FIG. 3C. Following this, a pipe may be inserted in the hole and may be made to pass through the lower conformable hole plug 210. The coarse thread 214 of the lower conformable hole plug 210 may adapt to the diameter of the pipe to provide a desirable fit. In embodiments, the hole in the preformed ring of the fire retardant sealant 212 may be larger than the diameter of the pipe and may be tamped into firm contact with the pipe.

Figure 4A:
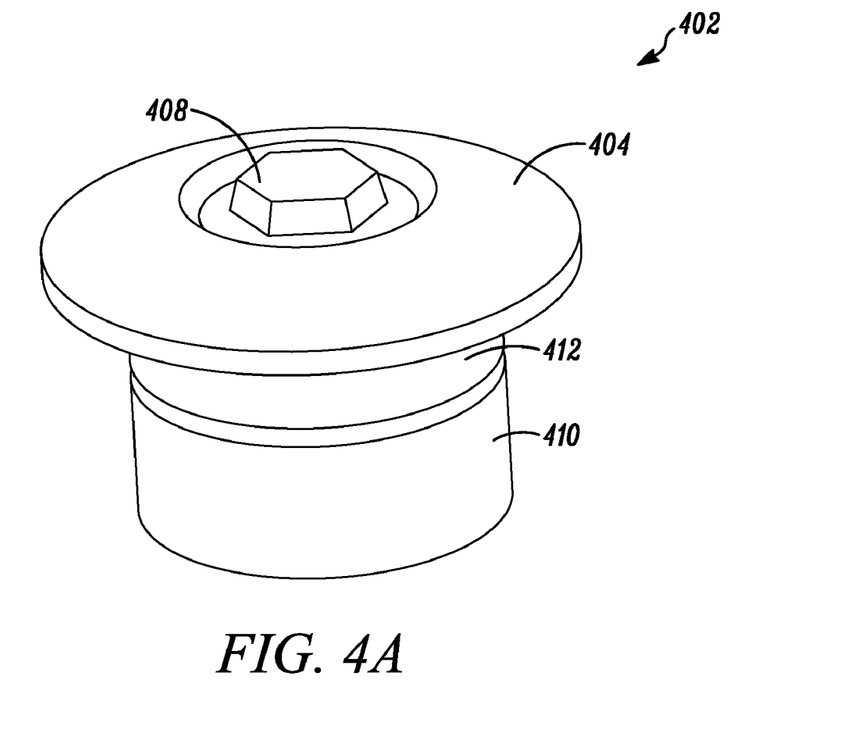
FIGS. 4A and 4B depict an exemplary deformable concrete hole plug according to another embodiment of the present invention.
Figure 4B:
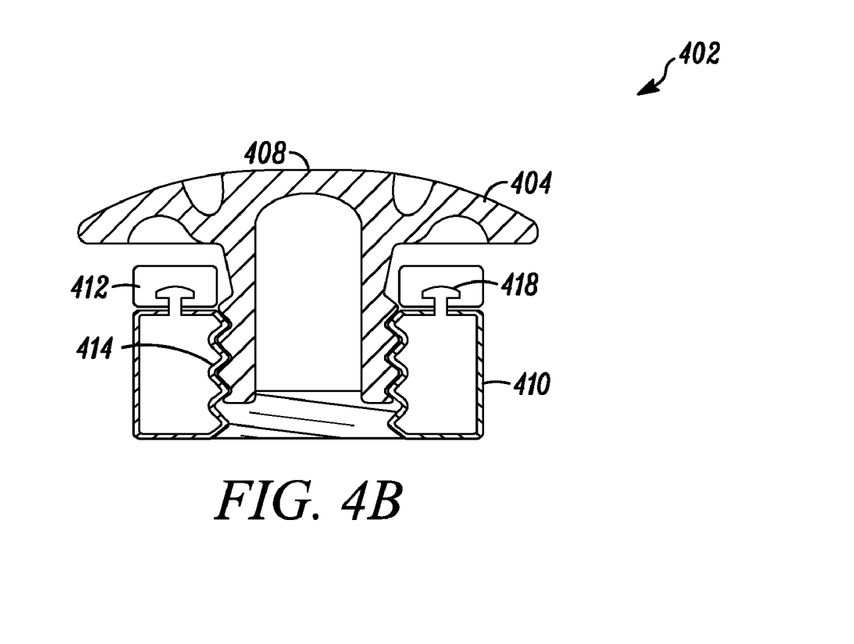

FIGS. 4A and 4B depict an exemplary deformable concrete hole plug 402 according to another embodiment of the present invention. The deformable concrete hole plug 402 may include a rigid top cover 404. Further, the rigid top cover 404 may be molded with an integral standard size hex nut protrusion 408, or other fastener, on the top surface that may engage a standard wrench. The rigid top cover 404 may be attached to a lower conformable hole plug 410 by a coarse tapered thread 414, as shown in FIG. 4B. The rigid top cover 404 and the lower conformable hole plug 410 may be screwed together by the hex nut 408, or other fastener, on the top cover. The lower conformable hole plug 410 may be pressurized by the tapered thread 414 and expand against the wall of the hole creating a water tight seal. The lower conformable hole plug 410 may have a microencapsulated adhesive or a peel away protected adhesive on the outside surface that may contact the concrete wall of the hole. Sandwiched between the lower conformable hole plug 410 and the rigid top cover 404 and affixed 418 to the hole plug may be a molded ring of fire retardant sealant 412 that is conformable with pressure.

FIG. 5 depicts exemplary steps of securing the deformable concrete hole plug 402 according to an embodiment of the present invention. The deformable concrete hole plug 402 may provide safety protection for a cored hole in a concrete slab per code requirements during the duration of its dormancy (non-use). Further, the deformable concrete hole plug 402 may seal that hole in a water tight manner using an expandable compliant plug technology for that period while leaving behind upon removal the lower conformable hole plug 410 that accommodates the intended pipe installation and sets a pre-molded fire-resistant caulk pipe perimeter seal, that may be required by code, that can be tamped into a fire retardant seal around the installed pipe.

Figure 5A:
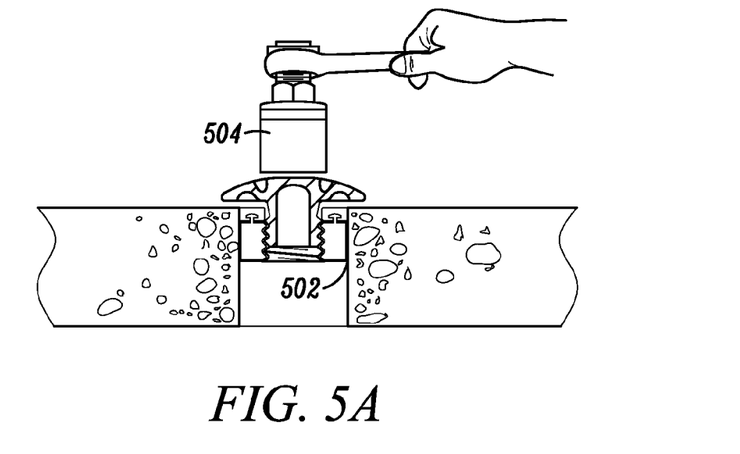
FIG. 5 depicts exemplary steps of securing a deformable concrete hole plug according to an embodiment of the present invention.

The peel away protected adhesive 508 on the outer surface of the lower conformable hole plug 410 may be exposed or activated by peeling the peel away protection layer. Further, the lower conformable hole plug 410 may be positioned into the hole and a wrench 504 may be used to screw the rigid top cover 404 into the lower conformable hole plug 410, as shown in FIG. 5A. As the rigid top cover 404 is screwed to the lower conformable hole plug 410, the lower conformable hole plug 410 expands against the wall of the hole. As a result of this, the adhesive 508 may be pressed against the wall to achieve a good bond. This also ensures a water tight seal between the wall of the hole and the lower conformable hole plug 410.

Figure 5B:
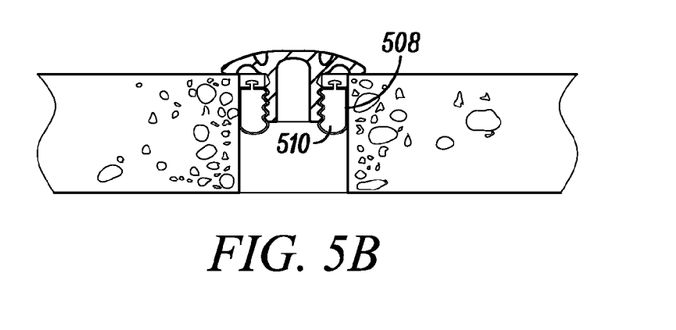

When the rigid top cover 404 has been fully fastened with the lower conformable hole plug 410, the lower conformable hole plug 410 may take an orientation as shown in FIG. 5B. In this orientation, the flange of the rigid top cover 404 may be substantially flush with the concrete floor and the nut 408 or other fastener may be below that surface. Further, the lower conformable hole plug 410 may be expanded 510 against the wall of the hole creating a water tight seal. Also, the pressure created because of the expansion of the lower conformable hole plug 410 helps in achieving a good bond between the wall of the hole and the lower conformable hole plug 410.

Figure 5C:
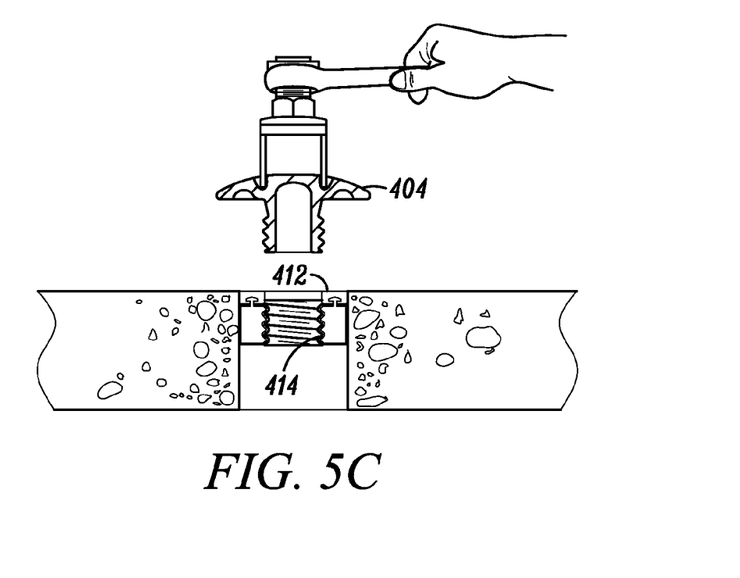

Once the lower conformable hole plug 410 is bonded with the wall of the hole, the rigid top cover 404 may be dismantled from the lower conformable hole plug 410 using the wrench 504. Dismantling the rigid top cover 404 and the lower conformable hole plug 410 may leave behind the lower conformable hole plug 410 adhered to the wall of the hole, as shown in FIG. 5C. Following this, a pipe may be inserted in the hole and may be made to pass through the lower conformable hole plug 410. The coarse tapered thread 414 of the lower conformable hole plug 210 may adapt to the diameter of the pipe to provide a desirable fit. In embodiments, the hole in the preformed ring of the fire retardant sealant 412 may be larger than the diameter of the pipe and may be tamped into firm contact with the pipe.

It may be appreciated by those skilled in the art that various modifications to the design of the concrete hole plug 402 may be possible without deviating from the scope of the invention. For example, in embodiments, the adhesive 508 on the outside surface of the lower conformable plug hole 410 may be replaced by any other means for bonding the lower conformable plug hole 410 with the wall of the hole. One such modification has been described in conjunction with FIG. 6.

Figure 6:
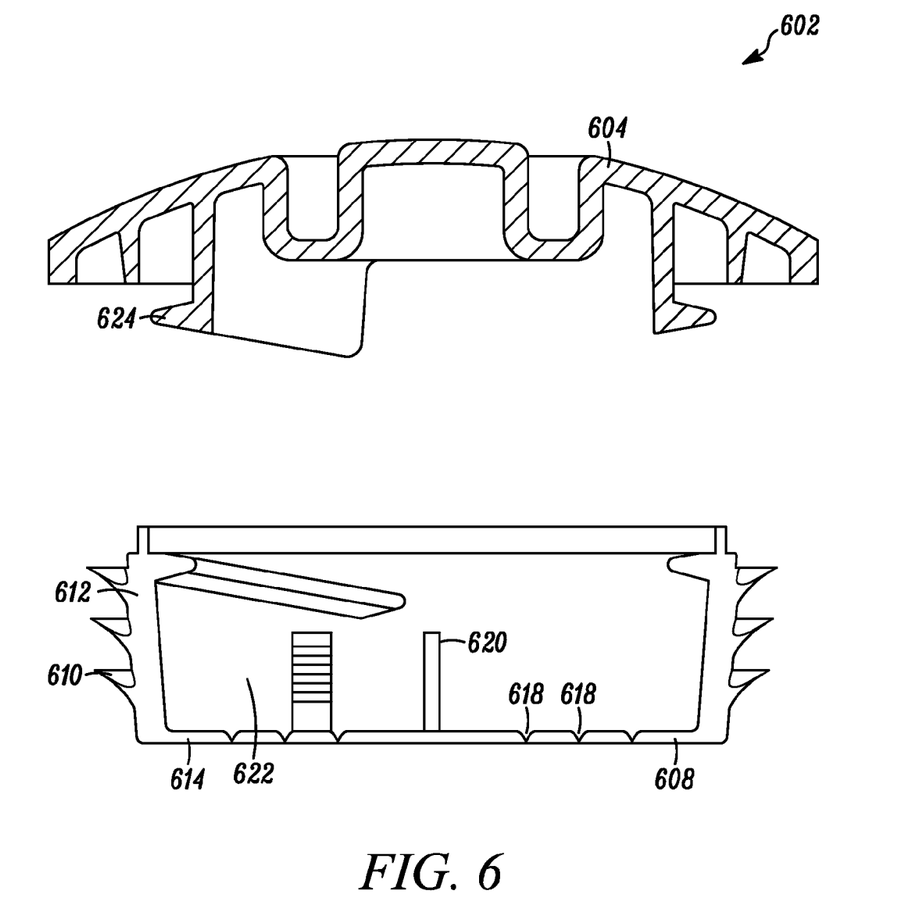
FIG. 6 depicts an exemplary concrete hole plug in accordance with an embodiment of the present invention.

FIG. 6 depicts an exemplary concrete hole plug 602 in accordance with an embodiment of the present invention. The concrete hole plug 602 may include an upper portion 604 and a lower portion 608. The upper portion 604 and the lower portion 608 may be attached by a coarse thread 624 in a similar manner as described in other embodiments. The coarse thread 624 may be a partial thread, i.e. a quarter thread or a half thread.

The lower portion 608 may include multiple fins 610 along the circumference of an outer surface 612 of the lower portion 608. Now, when the concrete hole plug 602 is pushed into the hole, these fins 610 may deform and may provide the necessary bonding/locking between the lower portion 608 and the wall of the hole.

In embodiments, a lower wall 614 of the lower portion 608 may include creases or dents or mechanically stamped thin outlines 618. These creases or dents or mechanically stamped thin outlines 618 may act as stress lines and may facilitate tear-out of the lower wall 614 to accommodate a pipe during fittings. Now, when the pipe is to be fitted in the hole and is made to pass through the lower portion 608 of the concrete hole plug 602, a hole of corresponding diameter may be punched or peeled out from the lower wall 614. For example, in case of a pipe of 3 inch diameter being inserted in the hole, a user may punch out a circular portion of 3 inch diameter from the lower wall 614. The circular portion may be easily punched out because of the presence of the creases or dents or mechanically stamped thin outlines 618. When the user applies force to tear the circular portion using a pull tab 620, a stress may be accumulated along these creases 618. As a result of this stress, the circular portion may be punched out with ease.

In embodiments, the lower wall 614 may be fabricated from rubber, plastic, thin metal material or the like. Further, the lower portion 608 may provide a well 622. The well 622 may hold fire-resistant sealant to form a perimeter seal on the installed pipe.

The specific embodiments provided and illustrated herein are meant only by way of description and are not intended to be comprehensive or exhaustive of all possible embodiments thereof. For example, not only can the covers of the present plugs include standard size nuts for operation with standard tools, but may include non-standard or other securing mechanisms which in some cases prevent unauthorized opening of the penetrations and securing removal or loss of the plugs. For example, hex nuts (or other configurations of nuts) can be used so that only a specialized custom tool can operate the hole plug. Also, Allen wrench operation using standard or non-standard wrench sizes is possible. In addition, the use of other materials in the fabrication of the present devices is possible. In addition, the frictional surfaces may be provided with special surface features to enhance the operation of the plugs.

The plugs can furthermore be easily constructed to be color-coded or include written symbols, words, or other indicia of their use (e.g., red plugs designating fuel line penetrations). Additionally, the plugs can include auxiliary attachments and features to enhance their operation. For example, including a lanyard or cord or chain that is attached at one end to the upper portion of the plug and the other end being attached to another portion such as a lower portion of the plug. The lanyard being of finite length, such as eight inches long, that prevent the loss of a cover for a temporarily-opened plug device where the cover portion thereof might be discarded or swept away or kicked away accidentally if left lying on the floor.

Other embodiments and modifications of the present disclosure are comprehended within the scope of the present invention and disclosure and can be appreciated by those skilled in the art.

Many other systems, methods, objects, features, and advantages of the present invention will be appreciated. All such systems, methods, object, features, and advantages are within the scope of the present disclosure.

While the invention has been disclosed in connection with certain preferred embodiments, those of ordinary skill in the art may recognize other embodiments, and all such variations, modifications, and substitutions may be intended to fall within the scope of this disclosure. Thus, the invention may be to be understood in the broadest sense allowable by law.

The invention claimed is:

1. A plug, comprising:
    a substantially tubular member having a proximal end and a distal end interconnected by a side wall, the side all having an inward facing surface and an outward facing surface, at least the outward facing surface being substantially conformable;
    an adhesive disposed on the outward facing surface;
    a fire-resistant ring disposed substantially at one of the ends of the tubular member; and
    a thread disposed along the inward facing surface, the thread adapted to receive a cover.

2. The plug of claim 1, wherein the ring comprises a fire-retardant sealant.

3. The plug of claim 1, wherein the tubular member comprises an elastomeric material.

4. The plug of claim 1, wherein the tubular member comprises a compliant material.

5. The plug of claim 1, wherein the adhesive is a microencapsulated adhesive.

6. The plug of claim 1, further comprising a peel-away layer disposed on the adhesive.

7. The plug of claim 1, wherein the adhesive is a time delay adhesive.

8. A kit for plugging a hole in a floor, the kit comprising:
    a plug, comprising:
        a substantially tubular member having a proximal end and a distal end interconnected by a side wall, the side wall having an inward facing surface and an outward facing surface, at least the outward facing surface being substantially conformable;
        an adhesive disposed on the outward facing surface;
        a fire-resistant ring disposed substantially at one of the ends of the tubular member; and
        a thread disposed along the inward facing surface, the thread adapted to receive a cover;
    and
    a cover having a top and a bottom, the bottom adapted to mate with the thread.

9. The kit of claim 8, wherein the top is substantially elastomeric.

10. The kit of claim 8, wherein the top is substantially rigid.

11. The kit of claim 8, wherein the cover is adapted to be substantially flush with a surface of a floor surface when the bottom is mated to the thread and the plug is positioned in a hole in the floor.

12. The kit of claim 8, wherein the cover comprises a nut disposed on the top.

13. The kit of claim 8, wherein the cover comprises a fastener disposed on the top.

14. The kit of claim 8, wherein the plug is adapted to expand as the bottom is mated to the thread.

15. The kit of claim 8, wherein the ring comprises a fire-retardant sealant.

16. The kit of claim 8, wherein the tubular member comprises an elastomeric material.

17. The kit of claim 8, wherein the tubular member comprises a compliant material.

18. The kit of claim 8, wherein the adhesive is a microencapsulated adhesive.

19. The kit of claim 8, further comprising a peel-away layer disposed on the adhesive.

20. The kit of claim 8, wherein the adhesive is a time delay adhesive.

* * * * *

UNITED STATES PATENT AND TRADEMARK OFFICE
CERTIFICATE OF CORRECTION

| | | |
|---|---|---|
| PATENT NO. | : 7,797,892 B2 | |
| APPLICATION NO. | : 12/028858 | |
| DATED | : September 21, 2010 | |
| INVENTOR(S) | : Vincent F. Cannistraro et al. | |

It is certified that error appears in the above-identified patent and that said Letters Patent is hereby corrected as shown below:

Col. 7 line 62, "a distal end interconnected by a side wall, the side all" should read -- a distal end interconnected by a side wall, the side wall --

Col. 8 line 8, "thread adapted to receive a cover." should read -- thread adapted to receive a cover that securely seals the plug. --

Col. 8 line 14, "comprises a compliant material." should read -- comprises a conformable material. --

Col. 8 line 32, "thread adapted to receive a cover;" should read -- thread adapted to receive a cover that securely seals the plug; --

Col. 8 line 54, "comprises a compliant material." should read -- comprises a conformable material. --

Signed and Sealed this
Twenty-eighth Day of December, 2010

David J. Kappos
*Director of the United States Patent and Trademark Office*